United States Patent [19]

Shibuya et al.

[11] 4,178,356

[45] Dec. 11, 1979

[54] PROCESS FOR MANUFACTURING CHLORINE DIOXIDE

[75] Inventors: Morioki Shibuya, Shibukawa; Isao Isa, Misato, both of Japan

[73] Assignee: The Japan Carlit Co., Ltd., Tokyo, Japan

[21] Appl. No.: 856,989

[22] Filed: Dec. 2, 1977

[51] Int. Cl.$^2$ ............................................... C01B 11/02
[52] U.S. Cl. ................................................... 423/478
[58] Field of Search ......................................... 423/478

[56] References Cited

U.S. PATENT DOCUMENTS

| | | | |
|---|---|---|---|
| 3,563,702 | 2/1971 | Partridge et al. | 423/478 |
| 3,829,557 | 8/1974 | Winfield | 423/478 |
| 4,075,308 | 2/1978 | Rapson et al. | 423/478 |
| 4,137,296 | 1/1979 | Glew et al. | 423/478 |

FOREIGN PATENT DOCUMENTS 1216447 12/1970 United Kingdom ..................... 423/478

OTHER PUBLICATIONS

Sundaram et al, "Chloro Complexes of Palladium (II) in Solution", *Journal of the American Chemical Society*, vol. 77, pp. 855-857 (1955).

Cotton et al, *Advanced Inorganic Chemistry*, 2nd Edition, Interscience Publishers, New York (1966) pp. 991, 992, 1026, 1029, 1030, 1033, 1034, 1035.

*Primary Examiner*—Brian E. Hearn
*Attorney, Agent, or Firm*—Frishauf, Holtz, Goodman & Woodward

[57] ABSTRACT

Chlorine dioxide is generated very efficiently and safely by reducing an alkali metal chlorate with hydrochloric acid in a single generator-crystallizer in the presence of a chloropalladinate(II) complex catalyst or a mixed catalyst consisting of said chloropalladinate(II) complex catalyst and a compound or ions selected from the group consisting of vanadium pentoxide, manganese ions, dichromate ions, lead ions, and arsenic ions.

9 Claims, No Drawings

PROCESS FOR MANUFACTURING CHLORINE DIOXIDE

BACKGROUND OF THE INVENTION

1. Field of the Invention

This invention relates to a process for manufacturing chlorine dioxide by the reaction of a chlorate and hydrochloric acid in the presence of a catalyst.

2. Description of the Prior Art.

Chlorine dioxide is a commercially important material in such fields as pulp bleaching and fat decoloring, and also has recently been used for the purpose of environmental protection and pollution abatement as in the removal of phenols from industrial sewage and in the denitration of industrial waste gases. Thus, it is highly desirable to have a process by which chlorine dioxide can be manufactured economically and safely.

A processs has been known in which sodium chlorate is reduced with sodium chloride in the presence of sulfuric acid at an elevated concentration. However, according to such process, a large amount of sulfuric acid is contained in the process effluents, rendering the process highly uneconomical unless recovery is made of such acid.

Furthermore, since sulfur is now commercially available at a reduced cost owing to the recently increasing introduction of desulfurization facilities, the sulfur compounds found in such effluents like sulfuric acid and sodium sulfate are losing their commercial value.

A process for reducing the amount of such byproduct sulfur compounds is described in Japanese Pat. No. 15890/1968 by which sodium sulfate is removed in the form of solid anhydrous sodium sulfate by maintaining the acidity of the reaction medium sufficiently low. Even with this process, however, 2.2 kg of sodium sulfate is produced for 1 kg of chlorine dioxide.

For the purpose of further reducing the amount of the byproduct sulfur compounds, another process was proposed to convert the byproduct sodium sulfate to sodium chloride using anhydrous hydrogen chloride (Pulp and Paper Canada Vol. 75 (10) 53–56 (1974)). This process is disadvantageous, however, in that it requires the use of expensive anhydrous hydrogen chloride and the installing of a second reactor, in addition to the chlorine dioxide generator, in which sodium sulfate and anhydrous hydrogen chloride are to be reacted.

One of the processes utilizing low acidities like the one mentioned above is described in U.S. Pat. No. 3,563,702 in which a catalyst selected from the group consisting of silver ions, manganese ions, vanadium pentoxide, dichromate ions and arsenic ions is used. Although it is claimed that all of these catalysts are equally effective, the inventors of this invention have found that the catalytic activity of silver ions, dichromate ions, and manganese ions is, respectively, 1000:10:1, vanadium pentoxide and arsenic ions being far less effective than manganese ions. In conclusion, when used alone as the catalyst, only the silver ions are useful commercially.

Still another process for reducing the amount of the byproduct sodium sulfate comprises feeding an alkali metal chlorate and hydrochloric acid into a single generator-crystallizer, thereby depositing the corresponding alkali metal chloride instead of the undesirable byproduct sulfur compounds. Such a process, as is described in Japanese Pat. No. 15391/1972, when utilizing sodium chlorate as the alkali metal chlorate, is expressed by the following equations:

$$NaClO_3 + 2HCl \rightarrow ClO_2 + \tfrac{1}{2}Cl_2 + NaCl + H_2O \quad (1)$$

$$NaClO_3 + 6HCl \rightarrow 3Cl_2 + NaCl + 3H_2O \quad (2)$$

The reaction medium has an acidity of 0.05 to 1.9 normal and is practically saturated with sodium chloride. A catalyst selected from the group consisting of vanadium pentoxide, silver ions, manganese ions, dichromate ions, and arsenic ions is used in this process. At such high chloride concentrations, however, the silver ions, being the only catalyst that is useful commercially for processes utilizing sulfuric acid as a strong acid, coprecipitate with the solid alkali metal chloride that is deposited and are removed from the reaction medium. As a result, the silver ion concentration of the reaction medium is reduced considerably, increasing the portion of reaction (2) and lowering the efficiency of chlorine dioxide generation. Thus, the silver ions can not be regarded as a useful catalyst for the hydrochloric process.

SUMMARY OF THE INVENTION

It is an object of this invention, therefore, to provide an excellent catalyst for efficiently manufacturing chlorine dioxide, said catalyst being capable of constantly manifesting a high catalytic activity even at low acidities and high chloride concentrations of the reaction medium.

It is another object of this invention to provide a process for manufacturing chlorine dioxide by using a catalyst being capable of constantly manifesting a high catalytic activity even at low acidities and high chloride concentrations of the reaction medium.

It is still another object of this invention to provide a process for manufacturing chlorine dioxide substantially free from any noxious effluents and completely closed up by the use of a single generator-crystallizer.

It is a further object of this invention to provide a process for manufacturing chlorine dioxide which does not produce any byproduct alkali metal sulfate of low commercial value.

It is a further object of this invention to provide a catalyst that does not form any coprecipitates with alkali metal chloride in the reaction medium nor is subject to any decomposition under the reaction conditions for manufacturing chlorine dioxide.

Other objects and advantages of the present invention may become apparent to those skilled in the art from the following description and disclosure.

DESCRIPTION OF THE PREFERRED EMBODIMENT

This invention relates to a process for manufacturing chlorine dioxide, chlorine and an alkali metal chloride by the reaction of the corresponding alkali metal chlorate and hydrochloric acid in a single generator-crystallizer, comprising a step of reacting an aqueous reaction medium containing (a) hydrochloric acid at an acidity of 0.01 to 2 normal, (b) an alkali metal chlorate at a concentration of 0.2 to 5 mol/l, (c) chloride ions at a saturated concentration in said reaction medium, (d) a chloropalladinate(II) complex catalyst or a mixed catalyst consisting of said chloropalladinate(II) complex catalyst and a compound or ions selected from the groups consisting of vanadium pentoxide, manganese ions, dichromate ions, lead ions, and arsenic ions, said chloropalladinate(II) complex catalyst being present at a concentration of 0.00001 to 0.004 g-atom/l as palladium, at a temperature of 25° to 90° C. under a reduced pressure of 20 to 400 mmHg, a step of evaporating water from said reaction medium, thereby depositing a solid alkali metal chloride therefrom, a step of withdrawing a gaseous mixture consisting of chlorine dioxide, chlorine and water vapor, and a step of recovering said solid alkali metal chloride.

The single generator-crystallizer to be used in the process of this invention can serve any single compartment vessel in which the step of reacting the alkali metal chlorate and hydrochloric acid to produce chlorine dioxide and chlorine, the step of evaporating water from the reaction medium, and the step of crystallizing the alkali metal chloride are conducted.

Hydrochloric acid should be present in the aqueous reaction medium contained in the single generator-crystallizer to give an acidity of 0.01 to 2 normal. At acidities below 0.01 normal, the rate of reaction (1) is too diminished to be economical, whereas at acidities higher than 2 normal, the reaction proceeds too rapidly to be conducted safely, and the rate of crystallization of alkali metal chloride becomes excessively high, resulting in finer crystals and consequently in difficulty in operation. The preferred acidity is 0.1 to 1.5 normal.

The alkali metal chlorate should be present in the reaction medium at a concentration of 0.2 to 5 mol/l or preferably 0.5 to 3 mol/l. If the chlorate concentration lies below such ranges, the rate of generation of chlorine dioxide becomes excessively low, and it also comes to be difficult to control the chlorate concentration itself, rendering the process commercially disadvantageous. On the other hand, if the chlorate concentration is too high, the amount of chlorate lost in that portion of the reaction medium that sticks to the deposited alkali metal chloride which is withdrawn from the system by means of a solid-liquid separator increases, thus adversely affecting the yield of chlorine dioxide with respect to the alkali metal chlorate that is fed to the system. The alkali metal chlorate is not limited to any particular member of the group, but sodium chlorate or potassium chlorate is most commonly used.

In this invention, an alkali metal chloride corresponding to the alkali metal chlorate used is crystallized in the single generator-crystallizer, since the reaction medium is kept saturated with respect to the alkali metal chloride. As the alkali metal chlorate concentration is increased from 0.2 mol/l to 5 mol/l, the saturated concentration of alkali metal chloride decreases from about 5 mol/l to about 2.5 mol/l.

It is very important in the present invention that the atomic ratio of chlorine atom to palladium atom in the reaction medium should be chosen appropriately in order to form the desired chloropalladinate(II) complex in the reaction medium. As was reported by K. A. Sundaram and E. B. Sandell (Journal of the American Chemical Society, Vol. 77, 855–857 (1955)), for example, as the atomic ratio of chlorine to palladium increases, the absorption maximum shifts from 380 nm to about 470 nm in a 1 normal aqueous hydrochloric acid solution.

Palladium(II) ion in the absence of chloride ions has an absorption maximum at 380 nm, whereas chloropalladinate(II) complexes in which one or more chloride ions are combined with a palladium(II) ion have absorption maximum at wave lengths longer than 380 nm.

It is discovered in the present invention that a chloropalladinate(II) complex catalyst having an absorption maximum at a wave length longer than 475 nm has a remarkably high catalytic activity, and that such a complex readily forms in the reaction medium at an atomic ratio of chlorine to palladium being 4355 to 500,000. The species having catalytic activity is presumably a chloropalladinate(II) complex in which five or more chloride ions are combined with a palladium(II) ion. The chloropalladinate(II) complex catalyst is used at a concentration of 0.00001 to 0.004 g-atom/l as palladium. Concentrations above 0.004 g-atom/l of palladium do not form said chloropalladinate(II) complex catalyst because the atomic ratio of the chlorine to palladium in reaction medium is less than 625, do not further increase the efficiency of generating chlorine dioxide and hence are uneconomical, whereas those below 0.00001 g-atom/l as palladium do not manifest any catalytic activity. The chloropalladinate(II) complex catalyst is preferably used at a concentration of 0.00005 to 0.003 g-atom/l as palladium. The chloropalladinate(II) complex catalyst is also used in a mixed catalyst in conjunction with vanadium pentoxide, manganese ions, dichromate ions, lead ion or arsenic ions.

The chloropalladinate(II) complex catalyst does not form any coprecipitates with alkali metal chloride in the reaction medium nor is subject to any decomposition under the reaction conditions.

The method of the present invention is conducted in a single generator-crystallizer. Each reactant is fed to said generator-crystallizer continuously. The aqueous reaction medium is subjected to a reduced pressure and heated so that boiling takes place. The amount of water removed from the solution by boiling is adjusted to be equal to the net increase in the amount of water added to the system through the feeds as well as by the result of the reaction. The level of the reaction medium in the generator-crystallizer can thus be maintained substantially constant. The water vapor serves to dilute the gaseous products and bring the chlorine dioxide content away from the explosion range, to expel said gaseous products from the solution surface, and to help said gaseous products disengage from inside the reaction medium. The loss of heat carried away by the water vapor is compensated by a heat exchanger installed within a recirculating system through which the reaction medium is recirculated.

As is mentioned above, the removal of water in accordance with this invention is effected under a reduced pressure, whereby the solution temperature is determined by the pressure and the composition of the reaction medium. The pressure employed in the present invention is 20 to 400 mmHg, whereby the temperature is kept at 25° to 90° C. If the pressure goes above 400 mmHg, then the temperature will exceed 90° C., resulting in the enhanced danger of explosion of chlorine dioxide. If a pressure below 20 mmHg is employed, the temperature of the system will go down below 25° C., resulting in excessively diminished rates of reaction, and the process will become uneconomical. The preferred range of pressure is 100 to 300 mmHg, thereby bringing the temperature between 50° and 85° C.

The solid alkali metal chloride formed in the course of reaction within the generator-crystallizer is withdrawn therefrom as a slurry and separated in a solid-liquid separator, the mother liquor being returned to the generator-crystallizer.

The solid alkali metal chloride thus separated can be electrolytically converted to the corresponding chlorate and again used for manufacturing chlorine dioxide.

If the single generator-crystallizer is used for chlorine dioxide generation, the molar ratio of alkali metal chlorate to alkali metal chloride in the reaction medium is relatively low because the reaction medium is kept saturated with respect to the alkali metal chloride as mentioned heretofore. It is well known that the efficiency of chlorine dioxide generation is reduced owing to the low molar ratio of alkali metal chlorate to alkali metal chloride (PULP AND PAPER MAGAZINE OF CANADA Vol. 68, p. 506–510 (1967)). When the single generator-crystallizer was not used for chlorine dioxide generation, the ratio of the rate at which $NaClO_3$ was consumed by reaction (1), $R_1$, to that by reaction (2), $R_2$, was found to be 15 to 19 even at a concentration of 0.0055 to 0.055 mol/l as palladium ion (Japanese Pat. No. 70-2645 and Reference Example 3 hereto). In this invention, it was unexpectedly found that the ratio of the rate at which $NaClO_3$ was consumed by reaction (1), $R_1$, to that by reaction (2), $R_2$, was raised to 32 by using the single generator-crystallizer for chlorine dioxide generation in spite of the relatively low molar ratio of alkali metal chlorate to alkali metal chloride and a relatively small amount of a chloropalladinate(II) complex catalyst in the reaction medium.

The following examples are given to further illustrate this invention, but it should be understood that the invention is by no means limited thereto. On the contrary, they are given only to clarify some of the essential embodiments of the present invention.

EXAMPLE 1

Two and one-half liters of an aqueous solution containing 100 g/l sodium chlorate, 240 g/l sodium chloride, and 0.167 g/l (0.00094 mol/l) chloropalladinate(II) was filled in a single generator-crystallizer and water was withdrawn therefrom at a rate of approximately 3 g/min under a reduced pressure of 195 mmHg at a temperature of 70° C. Concentrated hydrochloric acid and a 700 g/l sodium chlorate solution were continuously fed to the generator-crystallizer to maintain the volume and composition of the reaction medium substantially constant. Samples were taken every 30 minutes to analyze the gaseous mixture and the reaction medium. The mean composition of the reaction medium was found to be 0.2 normal in hydrochloric acid, 90 g/l sodium chlorate and 278 g/l sodium chloride, the chloropalladinate(II) complex having an absorption maximum at 475 nm. The ratio of the rate at which $NaClO_3$ was consumed by reaction (1), $R_1$, to that by reaction (2), $R_2$, was found to be 32. Although sodium chloride began to crystallize after 3 hours of reaction, no decrease in the reaction efficiency and no change in the composition were observed.

EXAMPLES 2 TO 10

The experiment of Example 1 was repeated except under the conditions listed in Table 1 which also gives the results obtained. In all examples, the chloropalladinate(II) complex having an absorption maximum at from 475 to 480 nm was formed in the reaction medium.

Table 1

| Example | Reaction temperature °C. | Reaction pressure mmHg | HCl N | NaCl g/l | $NaClO_3$ g/l | Catalyst | concentration mol/l | $R_1/R_2$ |
|---|---|---|---|---|---|---|---|---|
| 2 | 69 | 190 | 0.20 | 236–278 | 95 | chloropalladinate (II) | 0.00047 | 22.8 |
| 3 | 60 | 100 | 0.20 | 252–280 | 105 | chloropalladinate (II) | 0.00024 | 14.6 |
| 4 | 69 | 195 | 0.23 | 252–280 | 103 | chloropalladinate (II) | 0.00012 | 9.3 |
| 5 | 70 | 195 | 0.18 | 250–279 | 100 | chloropalladinate (II) $K_2Cr_2O_7$ | 0.00047 1.0 g/l | 49.0 |
| 6 | 71 | 200 | 0.15 | 240–255 | 200 | chloropalladinate (II) | 0.00009 | 27.6 |
| 7 | 71 | 195 | 0.20 | 240–280 | 99 | chloropalladinate (II) $MnCl_2$ | 0.00047 1.0 g/l | 27.6 |
| 8 | 71 | 195 | 0.21 | 240–280 | 100 | chloropalladinate (II) chloropalladinate (II) | 0.00047 1.0 g/l | 44.5 |
| 9 | 73 | 205 | 0.20 | 240–280 | 102 | chloropalladinate (II) $V_2O_5$ | 0.00047 1.0 g/l | 27.6 |
| 10 | 70 | 195 | 0.18 | 240–280 | 98 | chloropalladinate (II) $As_2O_3$ | 0.00047 1.0 g/l | 28.4 |

These examples show that the chloropalladinate(II) complex is effective even at a concentration of as low as 0.00009 mol/l. They further demonstrate that the palladium catalyst is also effective when used in conjunction with any of vanadium pentoxide, manganese ions, dichromate ions, lead ions, and arsenic oxide which gives arsenic ions on dissolving in the reaction medium.

REFERENCE EXAMPLE 1

The experiment of Example 1 was repeated but in the absence of the chloropalladinate(II) complex. The ratio of the rate at which $NaClO_3$ was consumed by reaction (1), $R_1$, to that by reaction (2), $R_2$ was found to be 2.

REFERENCE EXAMPLE 2

The experiment of Example 1 was repeated except that silver ions were used instead of the chloropalladinate(II) complex. The ratio of $R_1$ to $R_2$ of 11.5 was obtained until sodium chloride began to crystallize. After 3 hours of crystallization, however, the ratio of $R_1$ to $R_2$ went down to 3. During the same period, the silver ion concentration decreased from 0.1 to 0.005 g/l and a considerable amount of silver ions was found in the sodium chloride crystals that separated from the reaction medium.

REFERENCE EXAMPLE 3

Four hundred and thirty ml of an aqueous solution containing 450 g/l $NaClO_3$, 100 g/l NaCl and 0.336 g/l $PdCl_2$ were charged in a four-necked flask and the solution was kept at 40° C. Concentrated hydrochloric acid was continuously fed at a rate of 0.45 ml/min to the four-necked flask. The reaction medium was agitated by introducing air thereto at about 1 l/min and then the gas phase was analyzed.

The ratio of the rate at which $NaClO_3$ was consumed by reaction (1), $R_1$, to that by reaction (2), $R_2$, was found to be 19.

REFERENCE EXAMPLE 4

The experiment of Reference Example 3 was repeated but in the absence of palladium chloride.

The ratio of the rate at which $NaClO_3$ was consumed by reaction (1), $R_1$, to that by reaction (2), $R_2$, was 16.

What is claimed is:

1. A process for manufacturing chlorine dioxide, chlorine and an alkali metal chloride by the reaction of hydrochloric acid and the corresponding alkali metal chlorate in a single generator-crystallizer, comprising:

reacting an aqueous reaction medium containing (a) hydrochloric acid in a concentration of 0.01 to 0.23 normal, (b) said alkali metal chlorate in a concentration of 0.2 to 5 mol/l., (c) chloride ion in a concentration sufficient to saturate said reaction medium, (d) a chloropalladinate(II) complex catalyst or a mixed catalyst consisting of said chloropalladinate(II) complex catalyst and a compound or ions selected from the group consisting of vanadium pentoxide, manganese ions, dichromate ions, lead ions and arsenic ions, said chloropalladinate(II) complex having an absorption maximum wavelength longer than about 475 nm and being present at a concentration of 0.00001 to 0.001 g-atom/l based on palladium content and having an atomic ratio of said chloride ion to said palladium atom in said reaction medium of between about 4355 and 500,000, at a temperature of 25° to 90° C. under a reduced pressure of 20 to 400 mmHg, evaporating water from said reaction medium, whereby a solid alkali metal chloride is formed, withdrawing a gaseous mixture consisting of chlorine dioxide, chlorine and water vapor, and recovering said solid alkali metal chloride.

2. The process of claim 1 in which said alkali metal chlorate is sodium chlorate and said alkali metal chloride is sodium chloride.

3. The process of claim 1 in which said chloropalladinate(II) complex catalyst is present at a concentration of 0.00005 to 0.003 g-atom/l as palladium.

4. The process of claim 1 conducted at a temperature of 50° to 85° C. under a reduced pressure of 100 to 300 mmHg.

5. The process of claim 1 in which said mixed catalyst consists of said chloropalladinate(II) complex catalyst and vanadium pentoxide.

6. The process of claim 1 in which said mixed catalyst consists of said chloropalladinate(II) complex catalyst and manganese ion.

7. The process of claim 1 in which said mixed catalyst consists of said chloropalladinate(II) complex catalyst and dichromate ions.

8. The process of claim 1 in which said mixed catalyst consists of said chloropalladinate(II) complex catalyst and lead ions.

9. The process of claim 1 in which said mixed catalyst consists of said chloropalladinate(II) complex catalyst and arsenic ions.

* * * * *